June 11, 1957   H. W. BOOK   2,795,779
TRANSFORMER OVERLOAD INDICATORS
Filed Dec. 20, 1954
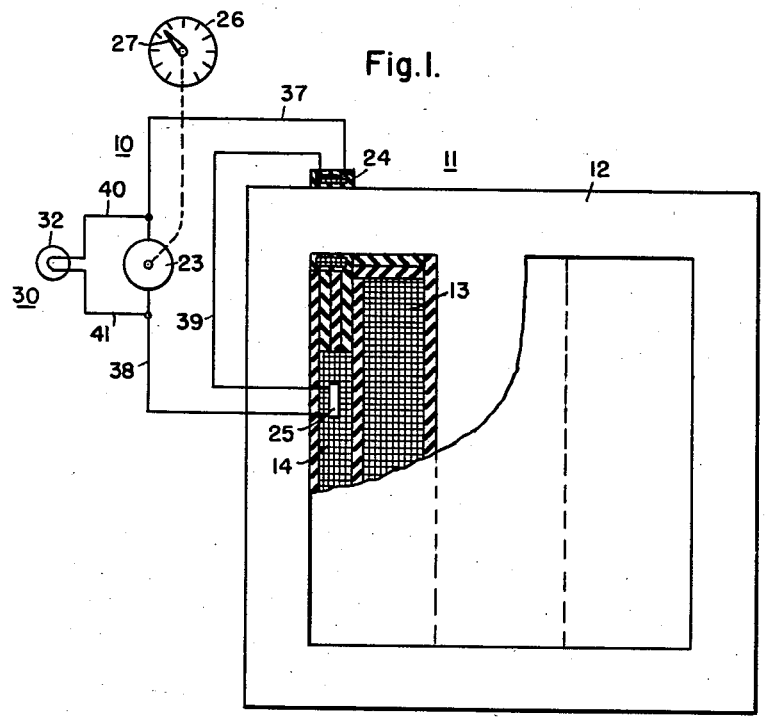
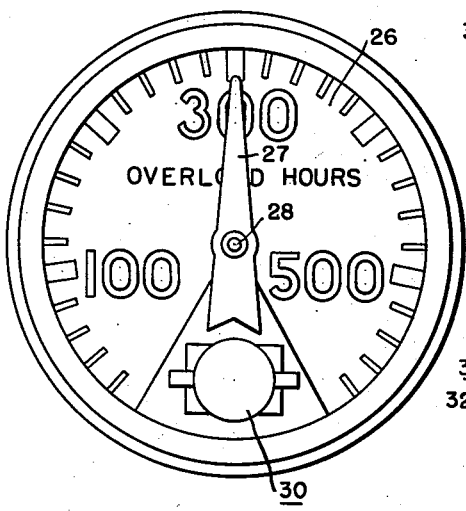
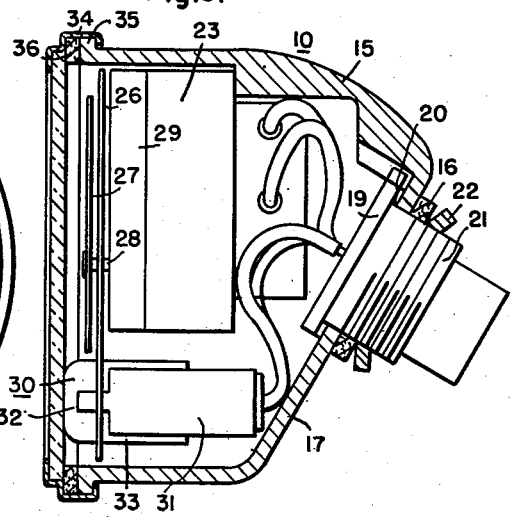
WITNESSES:
INVENTOR
Herbert W. Book.
BY
ATTORNEY

United States Patent Office 2,795,779
Patented June 11, 1957

2,795,779
TRANSFORMER OVERLOAD INDICATORS

Herbert W. Book, Sharon, Pa., assignor to Westinghouse Electric Corporation, East Pittsburgh, Pa., a corporation of Pennsylvania Application December 20, 1954, Serial No. 476,292

8 Claims. (Cl. 340—248)

The invention relates generally to overload indicators and more particularly to indicators for transformers mounted on poles and at similar heights.

In the operation of ordinary transformers without protective means, there is no way of knowing how long the transformer has been operated at loads in excess of rated capacity. The failure of such transformers has a fairly definite relation to the length of time the transformer has been overloaded. Therefore, it is highly desirable that some indicating means be provided for indicating the length of time a transformer has been subjected to a load in excess of the transformer thermal capacity.

An object of the invention is to provide for indicating a condition to which electrical apparatus has been subjected.

It is also an object of the invention to provide for indicating the length of time a piece of electrical apparatus has been subjected to overload conditions.

Other objects of the invention will in part be obvious and will in part appear hereinafter.

The invention, accordingly, comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawing, in which:

Figure 1 is a view in elevation of a transformer core and coil showing how the indicating device may be connected in relation to the transformer coil;

Fig. 2 is a view in front elevation of the indicating apparatus showing the arrangement of the dial and pointer; and Fig. 3 is a view in side elevation of the indicating apparatus with a portion cut away to show its construction.

Referring now to the drawing and Fig. 3 in particular, the indicator for electrical apparatus shown generally at 10 is a modification suitable for application to a distribution transformer. The transformer 11 to which the indicator 10 is applied comprises a core 12 and high and low voltage coils 13 and 14.

In the modification illustrated, the indicator comprises a case 15 which may be molded from some suitable material that will have adequate strength and capacity to resist weather. Since indicators of this type are primarily for transformers mounted on poles or in some location well above the ground level, the case is made of such a shape that when it is mounted on the transformer wall the face or dial 29 will be inclined at an angle to the horizontal. Since distribution transformers to which such indicators are usually applied are mounted on a pole or in a location substantially above the ground level, the tilting of the case of the indicator at an angle to the horizontal will facilitate reading from the ground. In this particular embodiment of the invention, the rear wall 17 of the case which is seated against the vertical wall of the transformer is disposed at the required angle to the dial 29 to give it the proper inclination to the horizontal.

In order to provide for making the necessary connections with the coils of the transformer 11, a hollow bushing 19 is disposed in an opening 20 provided in the rear wall 17 of the case. As shown, the hollow bushing has a flange on the inner end and is threaded at 21 to receive a nut 22. When the bushing is disposed in the opening 20, it may be projected through an opening in the transformer case and firmly clamped to the case by means of the flange and the nut 22. The wall of the transformer case will be clamped between a gasket 16 disposed on the bushing 19 and the nut 22.

The indicator comprises a motor 23 mounted in the case 15. The motor may be mounted in any well known manner, and the particular mounting need not be described.

Many different types of motors may be used successfully. Good results were obtained with a small hysteresis motor which has adequate power to rotate the hand or pointer to be referred to hereinafter. The power for driving the motor may be obtained from any suitable source.

Since it is desirable that the motor be not subjected to surges, a loosely coupled coil 24 has been utilized with success. Couplings of this type are well known in the art, as for example United States Letters Patent No. 2,298,126 issued October 6, 1942.

Since the indicator is primarily for indicating a condition of the electrical coils 13 and 14 of the transformer, provision has to be made to actuate the motor only when the coils are subjected to some such abnormal condition, as when the coils are overloaded. It is well known that when coils are loaded in excess of the thermal capacity for which they are designed that the temperature increases to the point where the insulation suffers some deterioration.

In this modification, a thermostat 25 or some other suitable heat responsive device is provided for controlling the supply of current to the motor 23. The thermostat or other heat responsive device may be associated with the coil in any suitable manner to make it responsive to the changes in temperature. In the modification illustrated, the heat responsive device 25 is embedded in the low voltage transformer coil 14. When a thermostat is employed as the heat responsive device, it is provided with some suitable switching means well known in the art for making and breaking the motor circuit.

In the particular modification of the invention embodying a thermostat, the motor will operate only when the thermostat has been actuated to close the motor circuit. This can be predetermined by the design of the thermostat and switch to take place immediately after the coils of the transformer have been subjected to a load greater than their thermal capacity.

As shown, the indicator is provided with a dial 26 which is graduated in hours. In the particular illustration, the dial will show up to 600 hours' overload. Of course, the dial could be designed to show any number of hours overload and when building an indicator, the number of hours indicated will be determined by the conditions to be met.

A hand pointer 27 mounted on a shaft 28 is disposed to rotate in front of the dial 26 to indicate the number of hours that the coils of the transformer have been overloaded. The shaft 28 is driven through a train of clock gears 29 from the motor 23. Trains of gears of this type are well known in the art and need not be described in detail. It will suffice to say that the gears are designed to drive the pointer 27 at the required speed to indicate the hours of loading above rated capacity to which the coils 13 and 14 have been subjected. This design of the gear train can be accomplished by anyone skilled in the art.

It will readily be appreciated that the speed of the pointer will be extremely slow and it would be impossible to observe movement when looking at the indicator from the ground. However, it is often desirable that when some one is making an inspection of the transformer that he be able to decide whether or not the transformer is overloaded at that particular time. In order to meet this problem, some suitable indicating device should be provided. In this particular modification of the invention, the indicating device 30 is a lamp which is also supplied with electrical energy from the loose coupling coil 24. Since a lamp is employed as the signal, it is essential that the loose coupling coil 24 be employed. Otherwise, the lamp would be subjected to surge voltages which would probably burn it out.

In this particular embodiment of the invention, the lamp comprises a socket 31 for holding the lamp 32 and a cap 33 made from some suitable translucent resinous material which cannot be easily shattered.

The dial 26 may be mounted in the case 15 in any suitable manner. As illustrated, a metallic ring 34 is provided for clamping the dial to a flange 35 provided in the forward end of the case 15. In order to seal the overload indicator, a gasket 36 is provided on the outer face of the case 15 and under the dial 26.

The indicator is connected to the transformer as illustrated in Fig. 1. The electrical connections will appear as an operation of the indicator as described and the circuits traced.

Assuming now that the coil 14 of the transformer has been subjected to an overload and that the temperature has risen to a point where the thermostat and switch 25 are actuated to close the motor circuit, then current flows from the loosely coupled coil 24 through conductor 37, motor 23, conductor 38, thermostatic switch 25 and conductor 39 back to the coil 24. The motor is now set in operation and starts a slow movement of the pointer 27.

Since the signal device 30 is connected in circuit relation with the motor 23 in this instance across the motor, an energizing circuit for the lamp is established. This circuit may be traced from the loosely coupled coil 24 through conductor 37, conductor 40, lamp 32, conductors 41 and 38 through the thermostatic switch 25 and conductor 39 back to the loosely coupled coil 24.

The motor 23 is now in operation driving the pointer 27 through the gear train. The signal light is being supplied with current and indicates that the motor is running. If the motor has been running for some time, the pointer will indicate a number of hours overload and the lamp will indicate that the motor is in operation so that the inspector will get the necessary information when he looks at the indicator. When the overload is discontinued the transformer coils cool and the thermostat switch is opened. The pointer stands in the position to which it has been turned and always indicates total hours of overload.

While it has been sugggested that the overload indicator described herein was developed primarily for transformers without overload protective devices it is to be understood that it may be utilized effectively with any transformer.

Since certain changes may be made in the above construction and different embodiments of the invention could be made without departing from the scope thereof, it is intended that all matter contained in the above description or shown in the accompanying drawing shall be interpreted as illustrative and not in a limiting sense.

I claim as my invention:

1. In an indicator for transformers provided with an electrical coil disposed to be energized, a case adapted to be mounted on the transformer, a dial and rotatable hand disposed in the case to indicate the length of time that the electrical coil has carried a load greater than its rated capacity, a motor for actuating the rotatable hand, a gear train disposed between the motor and rotatable hand to drive it at a speed in accordance with the calibrations on the dial, a second coil loosely coupled with the transformer for supplying electrical current to the motor, a switching device responsive to overload temperature embedded in the electrical coil for controlling the flow of electrical current from the loosely coupled coil to the motor when the electrical coil is overloaded to actuate the hand to indicate a function of the life of the insulation on the transformer coil, and a signal light connected in circuit relation with the motor to indicate when the motor is in operation.

2. In an indicator for electrical apparatus provided with an electric coil disposed to be energized, in combination, a case, a dial calibrated for indicating time disposed in the case, a hand rotatably disposed in the case to cooperate with the dial to indicate time, a motor connected to the hand for rotating it at a predetermined rate depending on the calibration on the dial, a loosely coupled coil associated with the electrical apparatus for supplying electrical current to the motor, a switching device responsive to the overload temperature of the electrical coil in the transformer for controlling the flow of electrical current from the loosely coupled coil to the motor whereby the hand will be actuated in proportion to the time that the motor is connected to the loosely coupled coil and the coil is loaded above rated capacity, and a signal light connected in circuit relationship with the motor to indicate when the motor is in operation.

3. In an indicator for a transformer provided with an insulated electrical coil to be energized, in combination, means for indicating the time the insulated electrical coil is overloaded which is a function of the life of the insulation, a motor for actuating the indicating means, a loosely coupled coil on the transformer coil for supplying current to the motor, a heat responsive device embedded in the insulated electrical coil for controlling the flow of current to the motor in response to overload and means connected in circuit relation with the motor for indicating when the motor is in operation.

4. In an indicator for electrical apparatus provided with an electrical coil provided with insulation which deteriorates when subjected to load currents greater than rated capacity, in combination, indicating means for indicating the period of time which the electrical coil has been subjected to a load current greater than its rated capacity, a motor for actuating the indicating means, a source of power for supplying electrical current to the motor, thermostatic means disposed to be responsive to the temperature of the coil for controlling the operation of the motor whereby when the coil is overloaded the indicating means will be actuated to record the period of time during which the coil has been overloaded, such period of time being a function of the life of the insulation.

5. In an indicator for a transformer provided with an insulated electrical coil, in combination, means for indicating the time the electrical coil of the transformer has been loaded above rated capacity which is a function of the life of the insulation, a motor for actuating the indicating means, a coil loosely coupled to the insulated transformer coil for supplying current to the motor, a temperature responsive device embedded in the transformer coil to respond to the temperature caused by loading the insulated coil above rated capacity to control the operation of the motor whereby the indicating means is driven to indicate the period of time during which the coil has been loaded above rated capacity.

6. In an indicator for a transformer provided with an insulated electrical coil, in combination, means for indicating the time the electrical coil of the transformer has been loaded above rated capacity which is a function of the life of the insulation, a motor for actuating the indicating means, a coil loosely coupled to the insulated transformer coil for supplying current to the motor, a temperature responsive device embedded in the transformer coil to respond temperature caused by loading the insulated coil above rated capacity to control the operation of the motor whereby the indicating means is driven to indicate the period of time during which the coil has been loaded above rated capacity, and signal means connected in circuit relationship with the motor for indicating when the motor is in operation.

7. In a transformer provided with an insulated electrical coil disposed to be energized, in combination, a dial calibrated in units of time, a rotatable hand disposed in front of the dial, a motor for actuating the hand, means inductively disposed relative to the insulated coil for supplying current to the motor, the motor being disposed to actuate the hand at a predetermined speed to indicate the period of time during which the coil has been subjected to an overload, the time the coil has been subjected to an overload being a function of the life of the insulation, a temperature responsive device embedded in the insulated electrical coil of the transformer and connected in series circuit relationship with the motor to control the operation of the motor.

8. In a transformer provided with an insulated electrical coil disposed to be energized, in combination, a dial calibrated in units of time, a rotatable hand disposed in front of the dial, a motor for actuating the hand, a coil disposed in inductive relationship with the insulated transformer coil for supplying current to the motor, the motor being disposed to actuate the hand at a predetermined speed to indicate the period of time during which the coil has been subjected to an overload, the time the coil has been subjected to an overload being a function of the life of the insulation, a temperature responsive device embedded in the insulated coil of the transformer and connected in series relationship with the motor to control the operation of the motor, and a lamp connected across the motor for indicating when the motor is in operation.

References Cited in the file of this patent

UNITED STATES PATENTS

| | | |
|---|---|---|
| 1,871,170 | Fryer | Aug. 9, 1932 |
| 2,173,458 | Trickey | Sept. 19, 1939 |
| 2,298,126 | Hodnette | Oct. 6, 1942 |
| 2,515,677 | Ussehman | July 18, 1950 |